WOODRUFF & PALMER.
Gas Regulator.
No. 12,844.
Patented May 8, 1855.
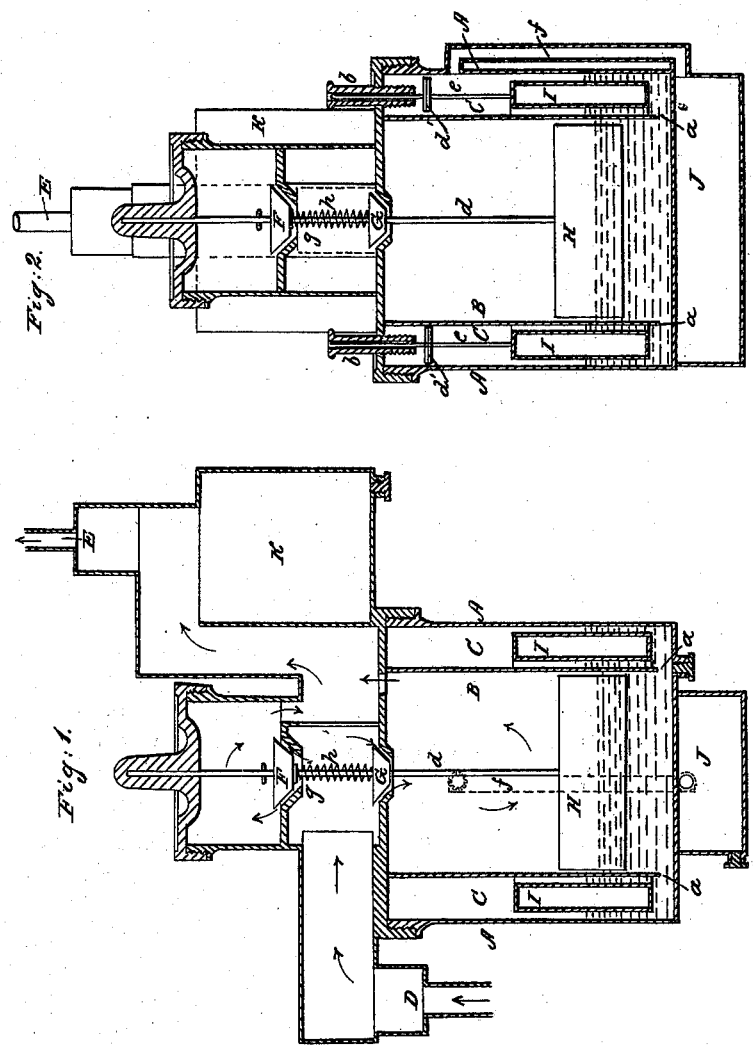

UNITED STATES PATENT OFFICE.

G. B. WOODRUFF AND J. N. PALMER, OF NEW HAVEN, CONNECTICUT.

GAS-REGULATOR.

Specification of Letters Patent No. 12,844, dated May 8, 1855.

*To all whom it may concern:*

Be it known that we, GEORGE B. WOODRUFF and JAMES N. PALMER, of the city and county of New Haven and State of Connecticut, have invented a new and useful Improvement in Apparatus for Regulating and Equalizing the Flow of Gas; and we do hereby declare that the following is a full, clear, and exact description of the same, reference being had to the accompanying drawing, forming part of this specification, in which—

Figure 1 is a central vertical section of a gas regulator constructed according to our invention. Fig. 2 is another central vertical section, taken at right angles to Fig. 1.

Similar letters of reference indicate corresponding parts in both figures.

A, B, are two cylinders arranged one within the other, with a communication all around the bottom as shown at $a$, $a$, which makes them equivalent to an inverted siphon. The space C, between the two cylinders constitutes an air chamber having communication with the atmosphere through two small tubes $b$, $b$, at the top, see Fig. 2; and the interior of the cylinder B, is what we term the gas chamber. The horizontal areas of these chambers may be either equal or unequal.

D, is the inlet and E, the outlet of the pipe which supplies the burners, the inlet having two communications with the outlet, viz: one directly through the seat of an induction valve, F and another through the seat of another induction valve G, thence through the chamber B, and passage C. The gas chamber is always kept filled with gas the pressure of which varies the same as it does in the pipe. The valves F, and G, are of conical form, and close downward. They are attached to a rod $d$, which is connected with the float H which rests on the water, oil or other liquid, represented in blue color in the lower part of the gas chamber. The gas and air chambers are supplied with water to such a height as to give the valves a full opening when the burners are all open and the pressure at the lowest. As the pressure in the pipe tends to increase either by reason of increased pressure on the main acting on the inlet or by the closing of some of the burners acting on the outlet, the pressure in the chamber B, increases and acts on the surface of the water in the chamber B, and depresses the level thereof by forcing it into the air chamber C, until the greater head in C, balances the pressure in B. The float H falls with the level of the water in the chamber B, and brings down the valves to contract the openings. When the pressure in the pipe diminishes either by diminution of pressure on the main or by opening more burners the pressure in B diminishes and the water rises therein and by raising the float opens the valves. Thus it is only necessary to have the valves properly proportioned to the rise and fall of the level of the water in the chamber B to make the pressure at the outlet E of the pipe perfectly uniform under all variations of pressure at the inlet, D. The pressure on the outlet may be increased or diminished at pleasure by adding to or taking from the quantity of water in the chambers B, C, so as to give a greater or less opening to the valves with a given pressure on the inlet.

I is a ring shaped float in the air chamber and $d'$, $d'$, two valves connected therewith by the two rods $e$, $e$, which work loosely through the tubes $b$, $b$, the bottoms of which form seats for the valves. Under all ordinary variations of the pressure of the gas the valves never reach their seats and the space within the tubes around the rods is sufficient for the free ingress and egress of air, to and from the chamber C, as the column of water in it rises and falls, but if the pressure in B, is increased to an extraordinary degree, the valves close the tubes by the rise of the float I consequent upon the increased head of water in C, and the air being confined in the upper part of C, is compressed before the water in B, can be pressed down below the regulating float H, to such a tension as to resist the further rise of water. The point at which the escape of air is stopped, may be regulated by screwing the pipes $b$, $b$, up or down and provision is made for that adjustment by fitting them to a screw easily, into the top of the chamber. Below the chamber C, is a waste chamber J, to which when there is too much water in the apparatus, it escapes from the chamber C, down the side pipe $f$; and there is also a waste chamber K below the outlet E to receive any water that may be taken up by the gas and afterward condensed.

In order to prevent the entire closing of both valves and cutting off the supply of gas by any sudden increase of pressure in the pipe and in the chamber B, caused by shutting off a number of lights or by other means, the valve F is not secured in a fixed position on the stem like the valve G, but is fitted so as to be capable of sliding upward. The rod d is provided with a collar or stop g to support it in such a position relatively to the valve F, that both might close together if permitted to do so, and it is confined to the collar g by a spring h, of only sufficient strength to bear the greatest ordinary degree of pressure of gas required at the outlet E. Now if the pressure in the gas chamber were ever to be sufficient to reduce the level of the water therein low enough for the float to close the valves, before they could close entirely, the underside of the valve F would receive nearly the full pressure which there was at the inlet D, and as the valve G, closed, the pressure on the valve F, would overcome the spring h, and cause it to slide up the rod, thus preventing it closing and holding it open until enough of the gas in the chamber B had escaped and been consumed, to reduce the pressure sufficiently for the valve G to open.

Instead of making the air and gas chambers with upright sides an inverted frustum of a cone may be substituted for the cylinder B to cause the gas chamber to enlarge downward and the air chamber to enlarge upward and thereby give a slower movement to the valves with a given increase or diminution of the pressure of the gas.

Having thus fully described our invention we will proceed to state what we claim and desire to secure by Letters Patent.

1. We claim: The employment of adjustable escape tubes or passages b, b, at the upper part of the air chamber in connection with valves attached to a float I which rises and falls with the water in the air chamber, the said valves acting substantially as herein described to close the said tubes or passages to confine the air in the air chamber when the water or other liquid reaches a certain level therein and thus prevent the water being in the gas chamber, pressed down below the regulating float H.

2. We claim: The employment of two induction valves F, G, arranged and connected by a spring h, in such a manner that when the pressure of gas in the gas chamber increases to such a degree that the action of the float would close both of the said valves and entirely shut off the gas, the said spring will yield to the pressure of the gas upon the under side or front of one of the valves and allow that valve to remain open until the pressure in the gas chamber is reduced and the level of the liquid therein is restored sufficiently to open the other valve, substantially as herein set forth.

GEORGE B. WOODRUFF.
JAMES N. PALMER.

Witnesses:
I. A. WOOD,
CHARLES IVES.